Nov. 29, 1927.  
V. H. GAA  
1,650,704  
VERNIER DIVIDER OR CALIPER  
Filed April 22, 1926
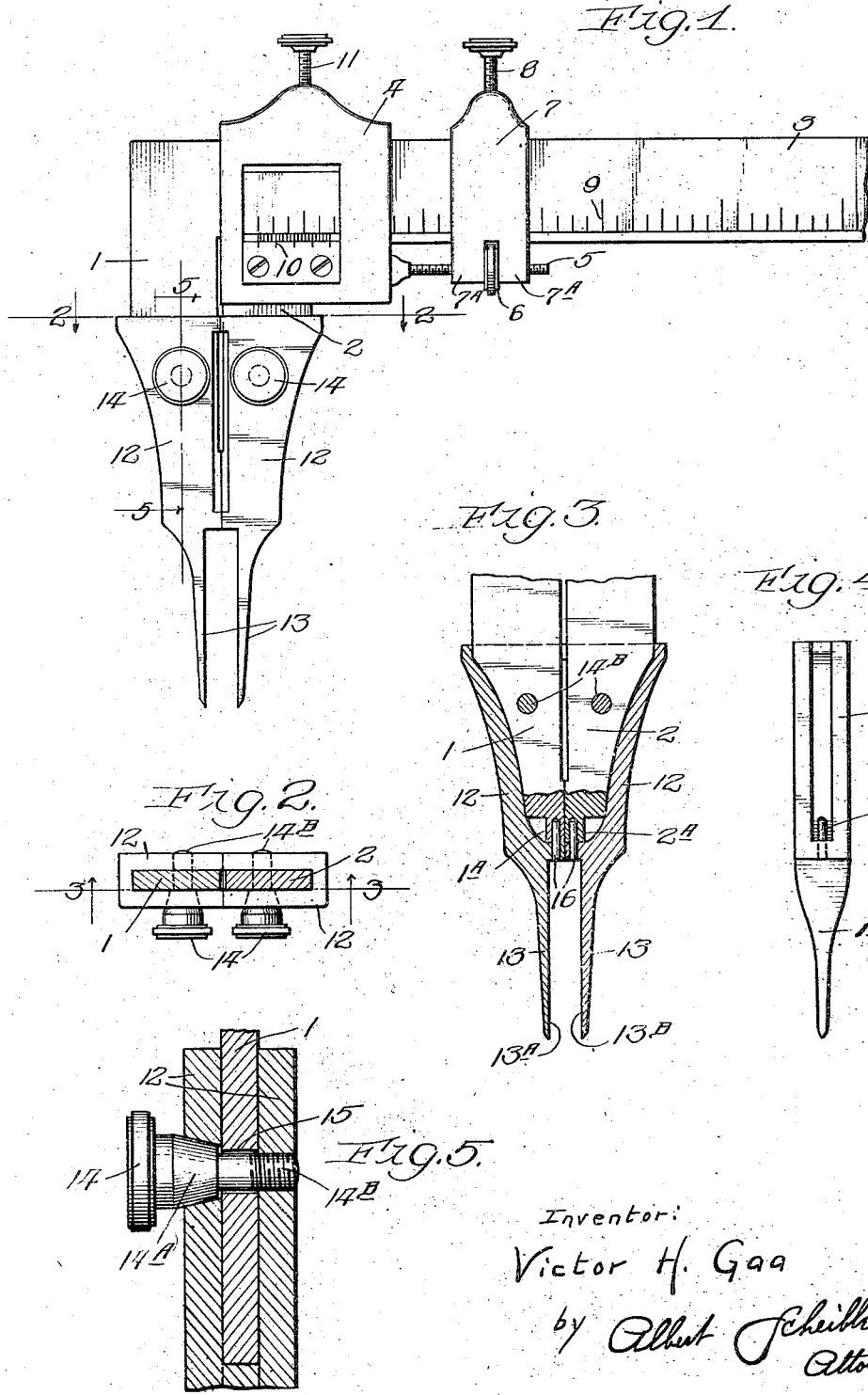
Inventor:  
Victor H. Gaa  
by Albert Scheibh  
Attorney Patented Nov. 29, 1927.

1,650,704

UNITED STATES PATENT OFFICE.

VICTOR H. GAA, OF DETROIT, MICHIGAN.

VERNIER DIVIDER OR CALIPER.

Application filed April 22, 1926. Serial No. 104,031.

My invention relates to dividing and calipering instruments, and in its general objects includes the providing of an instrument which will be equally suitable for calipering and for dividing, and in which the measurements can be accurately read on a vernier.

In a further object, my invention relates to divider attachments designed to be easily and accurately attached to the calipering arms of a vernier caliper and adapted to have the spacing of the divider points indicated by the usual caliper reading. Furthermore, my invention aims to provide divider arms constructed so that they will permit an easy regrinding of their tips without affecting the accuracy of the readings, and aims to provide simple and effective means for maintaining the divider arms accurately positioned with respect to the indicating portions of the instrument.

Illustrative of my invention, Fig. 1 is a fragmentary side elevation of a combined vernier caliper and vernier divider embodying the same.

Fig. 2 is a horizontal section taken along the line 2—2 of Fig. 1.

Fig. 3 is a fragmentary vertical section taken through the same instrument along the line 3—3 of Fig. 2.

Fig. 4 is a side elevation of one of the detachable divider arms.

Fig. 5 is an enlarged and fragmentary vertical section taken along the line 5—5 of Fig. 1.

In the illustrated embodiment, my combination vernier instrument includes a standard type of vernier caliper designed for accurate inside measuring by having a vernier scale arrangement graduated to indicate the distance between the oppositely directed parallel edges of the tips $1^A$ and $2^A$ on two main jaw portions 1 and 2, both of which extend at right angles to the main bar 3 of the instrument. The main jaw portion 1 is integral with this main bar, while the companion main jaw portion 2 is fast upon a slide 4 through which the main bar 3 slidably extends, and this slide has a threaded stem 5 projecting from it parallel to the bar 3. Threaded on this stem 5 is a nut 6 which fits closely between the forks $7^A$ of an auxiliary slide 7 through which the main bar 3 also extends, this auxiliary slide having a screw 8 threaded through it and adapted to engage the main bar so as to clamp the slide to the bar.

The main bar 3 has an indicating scale 9 at one of its longitudinal edges, and the slide 4 carries a vernier scale 10 adjacent to the said scale 9 to permit an accurate reading of the said spacing between the edges $1^A$ and $2^A$ of the jaw tip portions. The main slide 4 also has a screw 11 extending through it and adapted to clamp the main slide on the bar 3 after this slide has been accurately adjusted in position by manipulating the nut 6.

To adapt such a vernier caliper for use as an equally accurate dividing instrument, I provide two divider attachments respectively adapted to be attached to the arms 1 and 2 of the caliper. Each of these attachments has an upper portion 12 of approximately V-shape, with the bore of that portion closely fitting one of the said arms, and also has an integral lower part in the form of a slender divider arm 13.

The opposed faces $13^A$ and $13^B$ of these divider arms are in planes at right angles to the indication-carrying face of the main arm 3 of the instrument and are accurately spaced from each other by the same distance as that between the oppositely directed faces $1^A$ and $2^A$ of the caliper arm tips. Hence the same indicating reading which is accurate for the jaw tip portions when the instrument is used for measuring the diameter of a bore (or for any other inside measurement) is equally accurate for indicating the spacing of these faces $1^A$ and $2^A$. To utilize this arrangement, I grind the divider arms from their oppositely directed faces, thereby providing divider points in the said planes of the inner faces $13^A$ and $13^B$ of the divider arms.

For securing the detachable arms to the caliper arms, I preferably provide each detachable arm with a screw 14 having a tapering shank portion $14^A$ accurately fitting the taper of a bore in one side of the channel-sectioned upper portion 12 of that divider arm and having its free shank end 14ᴮ threaded into the other side of the same channel-sectioned portion, the screw having its intermediate portion passing through a perforation 15 in the corresponding caliper arm (1 or 2), as shown in Fig. 5. With the parts thus arranged, the conforming of the bore of the upper divider arm portion to the shape of the corresponding caliper arm portion guides the divider arm to its proper position when it is being attached, after which a tightening of the screw 14 springs the wings of the channeled divider arm portion 12 toward each other so as to clamp the interposed caliper arm part tightly between these wings. To increase the accuracy of this guiding and alining of the divider arms with respect to the caliper arms, I preferably provide these with auxiliary alining means, such as steel pins 16 fastened respectively to the divider arms and extending parallel to the faces 13ᴬ and each entering a corresponding bore in one of the caliper arm tips, as shown in Fig. 3.

With divider attachments thus constructed, the spacing between the divider points can easily be read—or predetermined—with the same high degree of accuracy as that of the usual caliper arm edges. And, since these spacings are identical, no calculations or allowances for variations in them are needed. Moreover, when the divider points get dull, I can still maintain this same accuracy by regrinding them so as to have the tips in the planes of the inner faces (13ᴬ and 13ᴮ) and so as to leave the divider arms of equal length. Hence my above described attachments provide a simple means for converting a standard vernier caliper into an equally convenient divider which can readily be adjusted with the same degree of accuracy and in which the adjusted spacing can instantly be read on the vernier scale. Since this direct-reading feature eliminates the need of applying the divider points to a scale for determining their distance, much time is saved in reading the the actual spacing. And, since the threaded connection between the two slides permits of a very delicate adjustment of the divider point spacing, I can secure a much greater accuracy of this adjustment than is possible with ordinary dividers.

Moreover, by making such divider arms detachable and by using a scale arrangement corresponding in indications to the spacing between two caliper arm edges, I provide a combination instrument which is equally suitable for accurate use in so-called inside calipering.

However, while I have illustrated and described my invention in a highly desirable embodiment, I do not wish to be limited to the details of the construction and arrangement thus disclosed, since changes might obviously be made without departing either from the spirit of my invention or from the appended claims.

I claim as my invention:

1. The combination with an inside caliper for inside measurements having a pair of relatively slidable single-jawed members provided with co-operating markings for indicating the spacing between the oppositely facing edges of the jaws of the two members, of a pair of pointed auxiliary members respectively detachably sleeved upon the said jaws and having their points spaced to aline respectively with the said jaw edges.

2. In combination, a caliper for inside measurements having a pair of relatively slidable members each provided with a jaw having a tip extending at right angles to the direction in which the members are relatively slidable, the said jaws having parallel outer edges and the said members have adjacent markings for indicating the spacing of the outer edges, the said jaw tips projecting for the same distance beyond the free ends of the jaws; and a pair of divider attachments of equal length each having one end pointed and having its other end portion sleeved upon the free end of one jaw and abutting against the end of the tip on that jaw, the said attachments having their pointed ends respectively in alinement with the said outer jaw edges.

3. A caliper and divider attachment combination as per claim 2, in which the said attachments have opposed faces respectively alining with the said outer jaw edges.

4. A combined caliper and scribing device comprising a bar, a slide movable upon the bar, two jaws having their main portions respectively fast upon the bar and the slide and extending in the same direction at right angles to the slide, the jaws also having tip portions presenting oppositely directed edges at right angles to the slide, the bar and the slide being provided with co-operating markings for indicating the spacing between the said oppositely facing edges; and a pair of pointed auxiliary members detachably sleeved respectively upon the main portions of the said jaws and laterally spaced from the said tip portions, the said members having points projecting beyond the said tip portions and spaced to aline respectively with the said edges of the jaw tip portions.

5. A combined caliper and scribing device as per claim 4, in which the auxiliary members have opposed faces at right angles to the slide and in alinement with the points of the said members, thereby permitting fresh points to be ground upon the said members without altering the accuracy of the indications afforded by the said co-operating markings.

6. In combination: an inside caliper having two jaws each provided with a tip, the two jaw tips extending alongside each other and having their oppositely facing object-engaging edges parallel; a pair of attachments respectively sleeved upon the two jaws and having opposed edges respectively alining with the said oppositely facing edges of the two jaws; each jaw having a bore extending parallel to the said edge thereof, and each attachment having a pin extending slidably into the said bore of the jaw upon which the attachment is sleeved.

Signed at Detroit, Michigan, April 16th, 1926.

VICTOR H. GAA.